(12) United States Patent
Honjo et al.

(10) Patent No.: US 9,732,395 B2
(45) Date of Patent: *Aug. 15, 2017

(54) INGOT FOR BEARING AND PRODUCTION PROCESS

(71) Applicants: JFE STEEL CORPORATION, Tokyo (JP); NTN CORPORATION, Osaka-shi, Osaka (JP)

(72) Inventors: Minoru Honjo, Kurashiki (JP); Kiyoshi Uwai, Kurashiki (JP); Shinji Mitao, Kurashiki (JP)

(73) Assignees: JFE STEEL CORPORATION, Tokyo (JP); NTN CORPORATION, Osaka-shi (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/347,386

(22) PCT Filed: Sep. 27, 2012

(86) PCT No.: PCT/JP2012/006168
§ 371 (c)(1),
(2) Date: Mar. 26, 2014

(87) PCT Pub. No.: WO2013/046678
PCT Pub. Date: Apr. 4, 2013

(65) Prior Publication Data
US 2015/0041026 A1 Feb. 12, 2015

(30) Foreign Application Priority Data
Sep. 30, 2011 (JP) .................. 2011-218229

(51) Int. Cl.
*C21D 9/40* (2006.01)
*C21D 8/00* (2006.01)
(Continued)

(52) U.S. Cl.
CPC ............... *C21D 8/005* (2013.01); *C21D 1/26* (2013.01); *C21D 7/13* (2013.01); *C21D 9/0081* (2013.01);
(Continued)

(58) Field of Classification Search
CPC ......... C22C 38/00; C22C 38/48; C22C 38/54; C22C 38/001; C22C 38/002; C22C 38/02;
(Continued)

(56) References Cited

U.S. PATENT DOCUMENTS

2012/0321503 A1 12/2012 Honjo et al.
2013/0017117 A1 1/2013 Honjo et al.
2013/0174945 A1 7/2013 Honjo et al.

FOREIGN PATENT DOCUMENTS

CN 101629267 A 1/2010
CN 103168112 A 6/2013
(Continued)

OTHER PUBLICATIONS

English Translation of JP 2007-063627A.*
(Continued)

*Primary Examiner* — Veronica F Faison
(74) *Attorney, Agent, or Firm* — Oliff PLC

(57) ABSTRACT

A method is provided with which a bearing steel, even when obtained from an ingot, is made to have a segregation part reduced in the degree of segregation and maximum inclusion diameter. The ingot contains 0.56-0.70 mass % C, 0.15-0.50 mass %, excluding 0.50 mass %, Si, 0.60-1.50 mass % Mn, 0.50-1.10 mass % Cr, 0.05-0.5 mass % Mo, up to 0.025 mass % P, up to 0.025 mass % S, 0.005-0.500 mass % Al, up to 0.0015 mass % O, and 0.0030-0.015 mass % N, with the remainder comprising Fe and incidental impurities. The ingot has a degree of segregation of 2.8 or less and a predicted value of the maximum diameter of inclusions
(Continued)

present in 30,000 mm² of the ingot, as calculated by extreme value statistics, of 60 μm or less.

16 Claims, 5 Drawing Sheets

(51) Int. Cl.

| | |
|---|---|
| *C22C 38/22* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C21D 7/13* | (2006.01) |
| *C21D 9/00* | (2006.01) |
| *C21D 1/26* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/44* | (2006.01) |
| *C22C 38/48* | (2006.01) |
| *C22C 38/50* | (2006.01) |
| *B22D 7/00* | (2006.01) |
| *F16C 33/12* | (2006.01) |

(52) U.S. Cl.
CPC .............. *C21D 9/40* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *C22C 38/48* (2013.01); *C22C 38/50* (2013.01); *B22D 7/00* (2013.01); *F16C 33/121* (2013.01)

(58) Field of Classification Search
CPC ......... C22C 38/04; C22C 38/06; C22C 38/42; C22C 38/44; C22C 38/32; C22C 38/28; C22C 38/26; C22C 38/24; C21D 7/13; C21D 9/0081; C21D 9/40; C21D 1/26; C21D 8/00; B22D 7/00
See application file for complete search history.

(56) References Cited

FOREIGN PATENT DOCUMENTS

| | | | | |
|---|---|---|---|---|
| JP | A-1-306542 | 12/1989 | | |
| JP | A-3-75312 | 3/1991 | | |
| JP | A-3-126839 | 5/1991 | | |
| JP | A-5-117804 | 5/1993 | | |
| JP | A-5-271866 | 10/1993 | | |
| JP | A-7-127643 | 5/1995 | | |
| JP | A-9-165643 | 6/1997 | | |
| JP | B2-3007834 | 2/2000 | | |
| JP | 2007063627 A | * | 3/2007 | ............. C22C 38/00 |
| JP | B2-4050829 | 2/2008 | | |
| JP | B2-4066903 | 3/2008 | | |
| JP | 2009-242937 A | 10/2009 | | |
| JP | A-2012-72485 | 4/2012 | | |
| JP | 2012-107308 A | 6/2012 | | |
| WO | 2011/065592 A1 | 6/2011 | | |
| WO | 2011/065593 A1 | 6/2011 | | |

OTHER PUBLICATIONS

Office Action issued in Japanese Patent Application No. 2013-527809 mailed Sep. 17, 2013 (with translation).
International Search Report issued in International Patent Application No. PCT/JP2012/006168 mailed Nov. 6, 2012.
Apr. 3, 2015 Office Action issued in Chinese Application No. 201280047872.2.
Mar. 11, 2015 Search Report issued in European Patent Application No. 12835952.8.

* cited by examiner

INGOT FOR BEARING AND PRODUCTION PROCESS

TECHNICAL FIELD

The present invention relates to an ingot material for bearings having excellent rolling contact fatigue life characteristics and thus being a suitable material for bearings used in automobiles, wind turbine generators, transportation equipment, electric machines, precision machines, and other industrial machinery in general, and to a method of manufacturing the same.

BACKGROUND ART

High carbon chromium steel (JIS G4805: SUJ2) has been widely used as such steel for bearings as described above. Bearing steel is generally required to exhibit excellent rolling contact fatigue life characteristics as one of the important characteristics thereof. The rolling contact fatigue life is presumably shortened by the presence of nonmetallic inclusions or eutectic carbides in bearing steel.

Recent studies have revealed that presence of nonmetallic inclusion in bearing steel is presumably the largest factor of causing deterioration of rolling contact fatigue life characteristics of the bearing steel. Content and size of nonmetallic inclusion have been therefore controlled by decreasing oxygen content in steel to prolong the product life of a bearing.

For example, JP 1-306542 A (PTL 1) and JP 3-126839 A (PTL 2) each propose a technique of controlling the composition, configuration or distribution of oxide-based nonmetallic inclusions in steel. However, PTL 1 and PTL 2 have problems in that the techniques thereof necessitate either introduction of expensive steelmaking facilities or significant modification of the existing facilities in order to manufacture bearing steel with fewer nonmetallic inclusions, resulting in an enormous economic burden on the practitioners.

Further, JP 7-127643 A (PTL 3) discloses a technique of improving the rolling contact fatigue life characteristics of bearing steel by controlling the degree of central segregation of carbon and the contents of oxygen and sulfur in the bearing steel. As mentioned above, however, to further reduce the oxygen content in steel to manufacture bearing steel having an even smaller amount of nonmetallic inclusions, it is necessary to either introduce expensive steelmaking facilities or significantly change the existing steelmaking facilities, leading to a problem with an increased economic burden on the practitioners.

In view of the circumstances described above, attention is now being paid to reducing eutectic carbide in steel, as well as reducing nonmetallic inclusion in the steel. For example, high carbon chromium steel containing carbon by 0.95 mass % or more is very hard and has good wear resistance. However, such high carbon chromium steel has a high degree of segregation at the central portion in cross section of a cast steel product (hereinafter, simply referred to as "central segregation") and further forms massive eutectic carbides in the casting steel, leading to the problem of poor rolling contact fatigue life. Accordingly, the central portion in cross section of the cast steel product is punched out as a waste material, or alternatively, high carbon chromium steel is subjected to a diffusion process for a long time (hereinafter, simply referred to as "soaking") to sufficiently dissipate any segregated elements and eutectic carbides from the steel.

To address the problem of segregation, JP 3007834 B (PTL 4) discloses a method for preparing a linear or bar-shaped rolled material having a specific chemical composition containing, for example, C: 0.6 mass % to 1.2 mass %, such that a total area of carbides having a thickness of 2 μm or more, observed in a central region which includes the central axis in a vertical cross section of the rolled material and extends from the central axis by D/8 (D: width of the vertical cross section) on respective sides from a central line in the vertical cross section passing through the central axis of the rolled material, is suppressed to 0.3% or less with respect to the area of the vertical cross section. Further, PTL 4 reveals how the content of massive carbides quantitatively affects the rolling contact fatigue life characteristics, and shows that massive eutectic carbides remain in steel and deteriorate the rolling contact fatigue life characteristics thereof.

JP 5-271866 A (PTL 5) discloses bearing steel that has a specific chemical composition containing particular elements such as C: 0.50 mass % to 1.50 mass % and Sb: 0.0010 mass % to 0.0150 mass %, and that is excellent in heat treatability and productivity with minimal formation of decarburized layers. The technique disclosed in PTL 5 involves adding Sb to the bearing steel for the purposes of reducing the formation of decarburized layers in the bearing steel and improving the heat treatability and productivity of the steel by omitting the cutting or grinding process after the heat treatment of the bearing steel. However, Sb is suspected to be quite harmful to human body and thus requires careful handling when applied to the steel. Further, when Sb is added to the steel, Sb concentrates in the central segregation zone of the steel, exacerbating the central segregation. A portion where Sb has concentrated may cause local hardening, providing a difference in hardness between the portion and the base material while serving as the origin of rolling contact fatigue fracture, which leads to deterioration in the rolling contact fatigue life characteristics of the steel.

In order to dissipate central segregation and massive eutectic carbides in the central segregation zone generated during casting of high carbon chromium bearing steel, JP 3-075312 A (PTL 6) discloses a method comprising rolling cast steel to a billet and subjecting the billet to soaking.

However, the steel has an uneven temperature distribution during soaking and thus the method of PTL 6 has a problem in that the soaking temperature may locally exceed a temperature corresponding to the solidus curve, which triggers local re-melting, causing eutectic reaction to form additional massive eutectic carbides in the steel.

In view of this, low carbon alloy steel can be employed instead of the aforementioned high carbon chromium steel, depending on the use application of bearing. For example, case hardening steel is used as the second most common option after high carbon chromium steel. However, in the case hardening steel, carbon is contained by 0.23 mass % or less, appropriate amounts of Mn, Cr, Mo, Ni, and the like are added thereto to obtain the quench hardenability and mechanical strength required, and surface hardening is performed through carburizing and carbonitriding for the purpose of improving the fatigue strength of the steel.

For example, JP 4066903 B (PTL 7) discloses case hardening steel that can be obtained through carburizing treatment in a short time by specifying the chemical composition thereof containing particular elements such as C: 0.10% to 0.35% and setting the value of activation energy Q for carbon diffusion in the steel, which is defined by the formula: $Q=34140-605 [\% Si]+183 [\% Mn]+136 [\% Cr]+122 [\% Mo]$, to be 34000 kcal or less.

Similarly, JP 4050829 B (PTL 8) discloses a technique regarding a carburized material having excellent rolling contact fatigue characteristics and having a specific chemical composition containing particular elements such as C: 0.1% to 0.45%, a carburized layer having an austenite grain size of No. 7 or higher, a carbon content at the surface of 0.9% to 1.5%, and a retained austenite content at the surface of 25% to 40%.

While the aforementioned carburizing and carbonitriding processes improve the rolling contact fatigue life characteristics of the steel, these processes significantly increase the manufacturing cost and decrease the yield due to large strain and dimensional changes, leading to a problem with increased cost of the final products.

In addition, bearing steel is required to have a large cross section depending on the use application thereof, in which case significant modification of the carburizing or carbonitriding facility is required correspondingly, leading to a problem with an enormous economic burden on the practitioners.

CITATION LIST

Patent Literature

PTL 1: JP 1-306542 A
PTL 2: JP 3-126839 A
PTL 3: JP 7-127643 A
PTL 4: JP 3007834 B
PTL 5: JP 5-271866 A
PTL 6: JP 3-075312 A
PTL 7: JP 4066903 B
PTL 8: JP 4050829 B

SUMMARY OF INVENTION

Technical Problem

Wind turbine generators, transportation machinery, and other general industrial machinery are increasingly becoming larger in size, and there is an urgent demand for bearing steel having a large cross section for use in these machinery components accordingly. Theoretically, bearing steel having a large cross section can be manufactured by replacing continuous casting as the conventional method for processing the material of bearing steel with ingot casting capable of addressing a wide range of cross sectional dimensions of the material. However, such steel manufactured by ingot casting (hereinafter, referred to as "ingot material" or "ingot steel") has a problem in that the resulting bearing steel has even worse rolling contact fatigue life characteristics if any segregation zone, such as a V-segregation zone and an inverse V-segregation zone, emerges on a rolling contact surface thereof. This is because as compared to continuous cast materials, ingot materials have a higher segregation rate and thus exhibit a higher degree of segregation and involves larger nonmetallic inclusions. Accordingly, it is important to suppress segregation and formation of nonmetallic inclusions in the ingot material.

Therefore, an object of the present invention is to provide a method for reducing the degree of segregation and the generation of coarse nonmetallic inclusions in the aforementioned segregation zone even in bearing steel made from an ingot material.

Solution to Problem

The inventors of the present invention made intensive studies on the means to solve the aforementioned problems and found that as compared to the conventional bearing steel, the degree of segregation can be reduced and the generation of coarse nonmetallic inclusions can be suppressed by selecting appropriate amounts of C, Si, Mn, Cr, and Al to be added to the steel and by optimizing the manufacture conditions. The inventors discovered that it is possible to reduce the degree of segregation and suppress the generation of coarse nonmetallic inclusions in a V-segregation zone and an inverse V-segregation zone, which would otherwise be problematic especially in ingot materials, with the result that bearing steel having excellent rolling contact fatigue life characteristics can be produced.

Specifically, the inventors prepared bearing steel samples having different contents of C, Si, Mn, Cr, Al, and Mo and different degrees of segregation represented by the formula (1) below from ingot materials, and made intensive studies on their microstructures and rolling contact fatigue life characteristics. Consequently, it was found that steel samples, even when obtained from ingots, could have improved rolling contact fatigue life characteristics as long as they have chemical compositions and degrees of segregation falling within a predetermined range. In addition, the inventors used ingot materials to produce bearing steel samples having different forging ratios for forging, and made intensive studies on their microstructures and rolling contact fatigue life characteristics. Consequently, it was found that steel samples, even when obtained from ingots, can have improved rolling contact fatigue life characteristics as long as they have forging ratios falling within a predetermined range. The present invention was completed based on these findings.

Primary features of the present invention are as follows.

[1] An ingot material for bearings comprising a chemical composition containing:
C: 0.56 mass % or more and 0.70 mass % or less;
Si: 0.15 mass % or more and less than 0.50 mass %;
Mn: 0.60 mass % or more and 1.50 mass % or less,
Cr: 0.50 mass % or more and 1.10 mass % or less;
Mo: 0.05 mass % or more and 0.5 mass % or less;
P: 0.025 mass % or less;
S: 0.025 mass % or less;
Al: 0.005 mass % or more and 0.500 mass % or less;
O: 0.0015 mass % or less;
N: 0.0030 mass % or more and 0.015 mass % or less; and
the balance being Fe and incidental impurities,
wherein a degree of segregation defined by the following formula (1) is 2.8 or less, and a predicted value of the maximum diameter of inclusions present in 30000 mm² of the ingot, as calculated by extreme value statistics, is 60 μm or less:

$$C_{Mo(max)}/C_{Mo(ave)} \leq 2.8 \quad (1)$$

where $C_{Mo(max)}$ represents a maximum of Mo intensity values and $C_{Mo(ave)}$ represents an average of Mo intensity values.

[2] The ingot material for bearings according to [1] above, wherein the chemical composition further contains at least one element selected from:
Cu: 0.005 mass % or more and 0.5 mass % or less; and
Ni: 0.005 mass % or more and 1.00 mass % or less.

[3] The ingot material for bearings according to [1] or [2] above, wherein the chemical composition further contains at least one element selected from:
W: 0.001 mass % or more and 0.5 mass % or less;
Nb: 0.001 mass % or more and 0.1 mass % or less;
Ti: 0.001 mass % or more and 0.1 mass % or less;
Zr: 0.001 mass % or more and 0.1 mass % or less; and
V: 0.002 mass % or more and 0.5 mass % or less.

[4] The ingot material for bearings according to any one of [1] to [3] above, wherein the chemical composition further contains B: 0.0002 mass % or more and 0.005 mass % or less.

[5] A method of manufacturing an ingot material for bearings, comprising: subjecting steel having the chemical composition according to any one of [1] to [4] above to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

In this case, the forging ratio is based on solid forging as specified in JIS G0701.

Advantageous Effect of Invention

The present invention allows stable manufacture of an ingot material for bearings having much better rolling contact fatigue life characteristics than that of the conventional bearing steel. Accordingly, the present invention also allows for production of ingot casting capable of addressing a wide range of cross sectional dimensions of bearing steel as required, thereby contributing to an increase in size of wind turbine generators, transportation machinery, and other general industrial machinery, and thus causing a useful effect in industrial terms.

BRIEF DESCRIPTION OF DRAWINGS

The present invention will be further described below with reference to the accompanying drawings, wherein.

DESCRIPTION OF EMBODIMENTS

Figure 1:
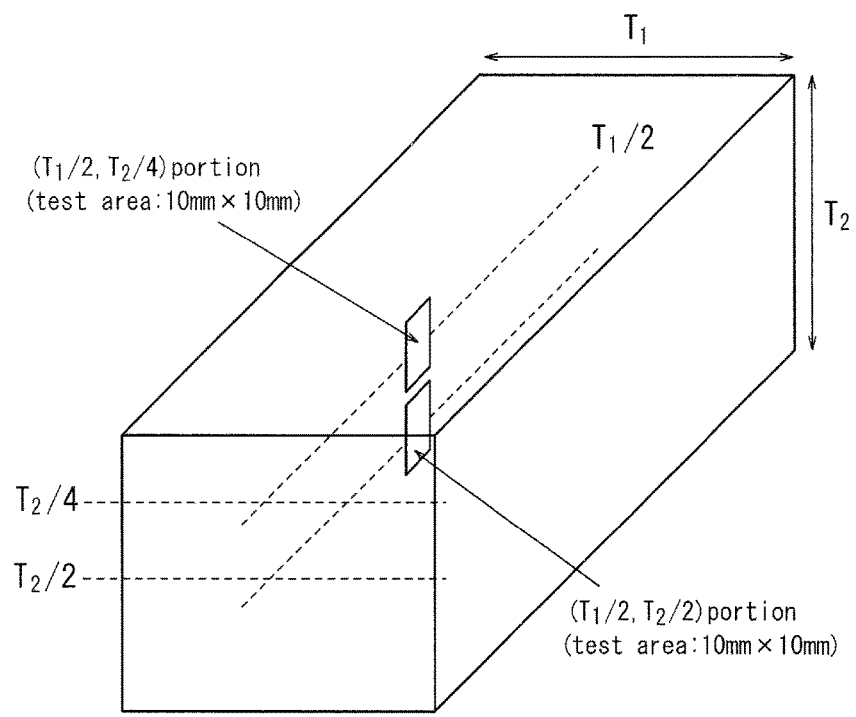
FIG. 1 is a diagram illustrating positions in a square-forged steel billet where samples for microstructure observation are collected from, and the test surface sizes.

Bearing steel according to the present invention will now be described in detail below.

At first, the reasons for limiting the contents of the components of the chemical composition of the bearing steel according to the present invention will be explained one by one.

C: 0.56 Mass % or More and 0.70 Mass % or Less

Carbon (C) is an effective element in terms of increasing strength and improving rolling contact fatigue life characteristics of steel. In the present invention, C content in steel is to be 0.56 mass % or more. However, C content in steel exceeding 0.70 mass % forms massive eutectic carbides during casting of the steel material, reducing the rolling contact fatigue life of the steel. Accordingly, the C content in steel is to be 0.56 mass % or more and 0.70 mass % or less, and preferably 0.56 mass % or more and 0.67 mass % or less.

Si: 0.15 Mass % or More and Less than 0.50 Mass %

Silicon (Si) is an element that is added to steel as a deoxidizing agent, and for the purposes of increasing the strength of the steel through solid solution strengthening and improving the rolling contact fatigue life characteristics of the steel. In the present invention, Si is added to the steel by 0.15 mass % or more. However, when Si is added to the steel by 0.50 mass % or more, Si combines with oxygen and remains as an oxide in the steel, resulting in deteriorated rolling contact fatigue life characteristics. Further, when Si concentrates in a segregation zone, it tends to incur the formation of eutectic carbides therein. Accordingly, the Si content in steel is to be less than 0.50 mass %, and preferably 0.15 mass % or more and 0.45 mass % or less.

Mn: 0.60 Mass % or More and 1.50 Mass % or Less

Manganese (Mn) is an element that is added to steel for the purposes of improving the quench hardenability, enhancing the toughness in the steel, and improving the rolling contact fatigue life characteristics of the steel material. In the present invention, Mn content in steel is to be 0.60 mass % or more. However, addition of Mn by more than 1.50 mass % deteriorates the rolling contact fatigue life characteristics. Further, when Mn concentrates in a segregation zone, it tends to incur the formation of nonmetallic inclusions. Accordingly, the Mn content in steel is to be up to 1.50 mass %, and preferably in the range of 0.60 mass % or more to 1.45 mass % or less.

Cr: 0.50 Mass % or More and 1.10 Mass % or Less

Chromium (Cr), as is the case with Mn, is an element that is added to steel for the purposes of enhancing the toughness in the steel and improving the rolling contact fatigue life characteristics of the steel material. In the present invention, Cr content in steel is to be 0.50 mass % or more. However, addition of Cr by more than 1.10 mass % tends to incur the formation of eutectic carbides and deteriorates the rolling contact fatigue life characteristics. Accordingly, the Cr content in steel is to be up to 1.10 mass %, and preferably in the range of 0.60 mass % or more to 1.10 mass % or less.

Mo: 0.05 Mass % or More and 0.5 Mass % or Less

Molybdenum (Mo) is an element that is added to steel for the purposes of obtaining higher quench hardenability and strength after tempering and improving the rolling contact fatigue life characteristics of the steel. In the present invention, Mo content in steel is to be 0.05 mass % or more. However, addition of Mo by more than 0.5 mass % tends to incur the formation of Mo-concentrated layers in a V-segregation zone, an inverse V-segregation zone or a central segregation zone, increases the degree of Mo segregation, and deteriorates the rolling contact fatigue life characteristics of the steel material. Accordingly, the Mo content in steel is to be up to 0.5 mass %, and preferably in the range of 0.05 mass % or more to 0.40 mass % or less.

P: 0.025 Mass % or Less

Phosphorus (P) is a harmful element that reduces the toughness of the base steel and deteriorates the rolling contact fatigue life characteristics of the steel material. It is thus preferable to minimize the P content in steel. In particular, P content in steel exceeding 0.025 mass % significantly deteriorates the toughness of the base steel and the rolling contact fatigue life characteristics of the steel material. Accordingly, the P content in steel is to be 0.025 mass % or less, and preferably 0.020 mass % or less. Note that the P content generally does not drop below 0.002 mass % because reducing the P content to zero % is difficult in industrial terms.

S: 0.025 Mass % or Less

Sulfur (S) exists as MnS, which is a nonmetallic inclusion, in steel. Since bearing steel contains a small amount of oxides which are likely to serve as the origin of rolling contact fatigue, the presence of a large amount of MnS in the steel results in reduced rolling contact fatigue life. It is thus preferable to minimize the S content in steel, which is to be 0.025 mass % or less in the present invention, and preferably 0.020 mass % or less. Note that the S content generally does not drop below 0.0001 mass % because reducing the S content to zero % is difficult in industrial terms.

Al: 0.005 Mass % or More and 0.500 Mass % or Less

Aluminum (Al) is an element that is added to steel as a deoxidizing agent, and for the purposes of refining austenite grains by forming a nitride and improving the toughness and rolling contact fatigue life characteristics of the steel. Thus, in the present invention, Al content in steel needs to be 0.005 mass % or more. However, Al content in steel exceeding 0.500 mass % provides coarse oxide-based inclusions in the steel, leading to deteriorated rolling contact fatigue life characteristics of the steel. In view of this, the Al content is to be up to 0.500 mass %, and preferably 0.450 mass % or less.

O: 0.0015 Mass % or Less

Oxygen (O) is an element that is bonded to Si and Al in steel to form hard oxide-based nonmetallic inclusions, thereby deteriorating the rolling contact fatigue life characteristics of the steel. It is thus preferable to minimize the O content in steel, which is to be 0.0015 mass % or less in the present invention, and preferably 0.0012 mass % or less. Note that the 0 content generally does not drop below 0.0003 mass % because reducing the 0 content to zero % is difficult in industrial terms.

N: 0.0030 Mass % or More and 0.015 Mass % or Less

Nitrogen (N) is an element that is bonded to Al in steel to form nitride-based nonmetallic inclusions, thereby refining austenite grains and improving the toughness and rolling contact fatigue life characteristics of the steel. Accordingly, N content in steel is to be 0.0030 mass % or more in the present invention. However, addition of N by more than 0.015 mass % deteriorates the rolling contact fatigue life characteristics of the steel due to the presence of a large amount of nitride-based inclusions in the steel, and reduces the toughness of the steel due to the presence of a large amount of nitrogen not in the form of nitride (i.e. free nitrogen) in the steel. Accordingly, the N content in steel is to be up to 0.015 mass %, and preferably 0.010 mass % or less.

Figure 5:
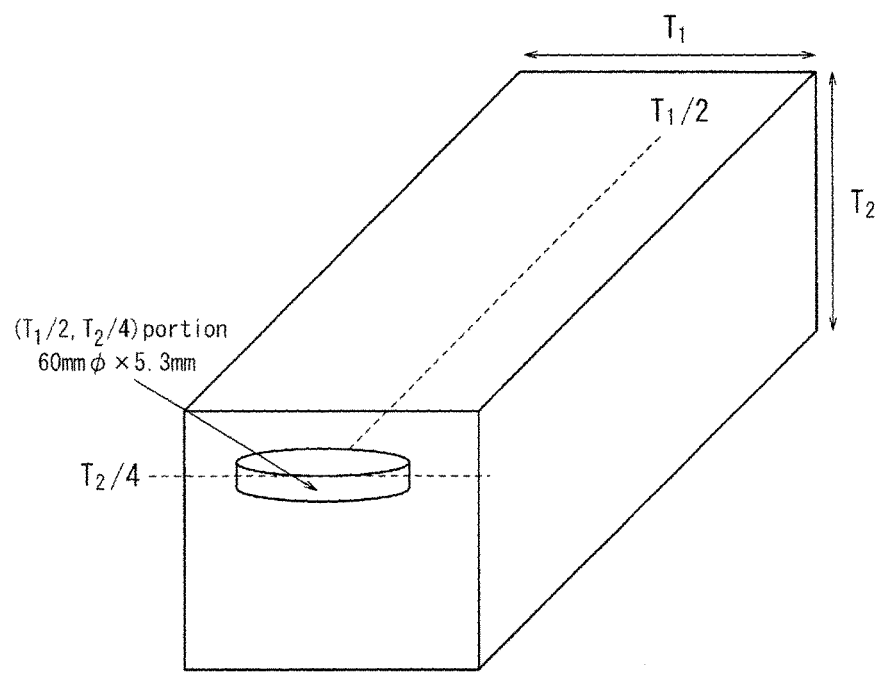
FIG. 5 is a diagram illustrating a position in a square-forged steel billet where a sample for rolling contact fatigue life evaluation is collected from, and the test piece size.

A Predicted Value of the Maximum Diameter of Inclusions Present in 30000 $Mm^2$ of the Ingot, as Calculated by Extreme Value Statistics, is 60 μm or Less Then, the inventors prepared ingot materials according to the chemical compositions shown in Table 1 and the manufacturing conditions shown in Table 2, and investigated the degree of Mo segregation (which is also simply referred to as "the degree of segregation" hereinafter) according to the above formula (1), the maximum diameter of inclusions, and the rolling contact fatigue life characteristics. Note that Reference Steel A-1 is the one corresponding to JIS SUJ2, which is very commonly used as bearing steel. The degree of segregation, the maximum diameter of inclusions, and the rolling contact fatigue life characteristics were investigated by a testing method similar to that used in the examples described below. Specifically, the investigation included: collecting a test piece for observation of nonmetallic inclusions and a test piece for EPMA mapping analysis from a forged steel sample as shown in FIG. 1; collecting a test piece for rolling contact fatigue analysis from the steel sample as shown in FIG. 5; and investigating the degree of segregation, diameter of nonmetallic inclusion, and rolling contact fatigue life characteristics of the test pieces, respectively, using the test method described below.

Each test piece was collected from a forged steel billet at a portion corresponding to the bottom side of the ingot material.

TABLE 1

| Steel Sample ID | Chemical Composition (mass %) | | | | | | | | | | Remarks |
|---|---|---|---|---|---|---|---|---|---|---|---|
| | C | Si | Mn | P | S | Cr | Al | Mo | O | N | |
| A-1 | 1.05 | 0.25 | 0.45 | 0.016 | 0.008 | 1.45 | 0.025 | 0.18 | 0.0010 | 0.0031 | Reference Steel |
| A-2 | 0.64 | 0.25 | 0.86 | 0.008 | 0.002 | 0.78 | 0.030 | 0.26 | 0.0009 | 0.0033 | Conforming Steel |

TABLE 2

| | | Manufacturing Conditions | | | | | | | | |
|---|---|---|---|---|---|---|---|---|---|---|
| | | Cross Section Size before Forging | | Heating Condition | | Cross Section Size after Forging | | Forging Ratio | | |
| No. | Steel Sample ID | Top Side (mm) | Bottom Side (mm) | Heating Temp. (° C.) | Heating Time (hr.) | Top Side (mm) | Bottom Side (mm) | Top Side (mm) | Bottom Side (mm) | Remarks |
| 1-1 | A-1 | 1330 × 1230 | 1280 × 860 | 1150 | 10 | 550 × 550 | 550 × 550 | 5.4 | 3.6 | Reference Steel |
| 1-2 | A-2 | 1330 × 1230 | 1280 × 860 | 1250 | 24 | 1050 × 1050 | 1050 × 860 | 1.5 | 1.2 | Comparative Example |
| 1-3 | A-2 | 1330 × 1230 | 1280 × 860 | 1250 | 24 | 790 × 790 | 790 × 790 | 2.6 | 1.8 | Comparative Example |
| 1-4 | A-2 | 1330 × 1230 | 1280 × 860 | 1250 | 24 | 740 × 740 | 740 × 740 | 3.0 | 2.0 | Inventive Example |
| 1-5 | A-2 | 1330 × 1230 | 1280 × 860 | 1250 | 24 | 640 × 640 | 640 × 640 | 4.0 | 2.7 | Inventive Example |
| 1-6 | A-2 | 1330 × 1230 | 1280 × 860 | 1250 | 24 | 560 × 560 | 560 × 560 | 5.2 | 3.5 | inventive Example |
| 1-7 | A-2 | 1330 × 1230 | 1280 × 860 | 1250 | 24 | 500 × 500 | 500 × 500 | 6.5 | 4.4 | Inventive Example |
| 1-8 | A-2 | 1330 × 1230 | 1280 × 860 | 1250 | 24 | 460 × 460 | 450 × 450 | 7.7 | 5.4 | Inventive Example |

The evaluation results are shown in Table 3. Those ingot materials that were obtained under the condition Nos. 1-2 and 1-3 where the forging ratio (on the bottom side) is less than 2.0 have larger maximum diameters of inclusions, showing little improvement in the rolling contact fatigue life characteristics as compared to steel (Steel No. A-1) prepared under the reference condition No. 1-1. It can be appreciated that those ingot materials that were prepared under the condition Nos. 1-4 to 1-8 where the forging ratio is not less than 2.0 and the maximum diameter of inclusions is not more than 60 μm show better rolling contact fatigue life characteristics than steel (Steel No. A-1) prepared under the reference condition No. 1-1. These analyses revealed that the rolling contact fatigue life characteristics of steel could be improved by setting the forging ratio to be 2.0 or more to suppress the formation of coarse nonmetallic inclusions in the steel.

TABLE 3

Experimental Results

| No. | Steel Sample ID | $C_{Mo(max)}/C_{Mo(ave)}$ | Maximum Diameter of Inclusions (μm) | Rolling Contact Fatigue Life Ratio | Remarks |
|---|---|---|---|---|---|
| 1-1 | A-1 | 1.8 | 40.3 | 1.00 | Reference Steel |
| 1-2 | A-2 | 2.3 | 71.3 | 0.97 | Comparative Example |
| 1-3 | A-2 | 2.4 | 61.5 | 1.02 | Comparative Example |
| 1-4 | A-2 | 2.1 | 49.8 | 1.32 | Inventive Example |
| 1-5 | A-2 | 2.3 | 41.5 | 1.36 | Inventive Example |
| 1-6 | A-2 | 2.4 | 38.2 | 1.41 | Inventive Example |
| 1-7 | A-2 | 2.3 | 31.3 | 1.42 | Inventive Example |
| 1-8 | A-2 | 2.2 | 29.5 | 1.44 | Inventive Example |

Accordingly, restricting the maximum diameter of nonmetallic inclusions in an ingot material to be 60 μm or less is effective for improving the rolling contact fatigue life characteristics. In this case, in restricting the maximum diameter of nonmetallic inclusions, a predicted value of the maximum diameter of inclusions present in 30000 mm² of the ingot, as calculated by extreme value statistics, is set to be 60 μm or less. The reason is that the risk volume in the ongoing rolling contact fatigue test was equal to 30000 mm² in area, and hence a predicted value of the maximum diameter of inclusions present in 30000 mm² of the ingot was used.

Degree of Segregation $(C_{Mo(max)}/C_{Mo(ave)}) \leq 2.8$

Further, the inventors prepared bearing steel samples with the chemical compositions shown in Table 4 and under the manufacturing conditions shown in Table 5, and investigated the degree of segregation, the maximum diameter of inclusions, and the rolling contact fatigue life characteristics of the bearing steel samples thus prepared. Note that in Table 5 Heating Temperature under Heating Condition 1 is a temperature at which an ingot material was subjected to heating treatment for the purposes of performing forging and reducing the degree of segregation, while Heating Temperature under Heating Condition 2 is a temperature at which the ingot material was subjected to additional heating treatment after the forging for the purpose of further reducing the degree of segregation. The degree of segregation, the maximum diameter of inclusions, and the rolling contact fatigue life characteristics were investigated by a testing method similar to that used in the examples described below. Specifically, a test piece for observation of nonmetallic inclusions and a test piece for EPMA mapping analysis were collected from the forged steel sample as shown in FIG. 1; a test piece for rolling contact fatigue analysis was collected from the steel sample as shown in FIG. 5; and the test pieces thus collected were subjected to investigation of the degree of segregation, diameter of nonmetallic inclusion, and rolling contact fatigue life characteristics, respectively, using the test method described below.

Each test piece was collected from a forged steel billet at a portion corresponding to the bottom side of the ingot material.

TABLE 4

Chemical Composition (mass %)

| Steel Sample ID | C | Si | Mn | P | S | Cr | Al | Mo | O | N | Remarks |
|---|---|---|---|---|---|---|---|---|---|---|---|
| A-1 | 1.05 | 0.25 | 0.45 | 0.016 | 0.008 | 1.45 | 0.025 | 0.18 | 0.0010 | 0.0031 | Reference Steel |
| B-1 | 0.63 | 0.23 | 0.88 | 0.007 | 0.002 | 0.77 | 0.028 | 0.25 | 0.0009 | 0.0034 | Conforming Steel |

TABLE 5

Manufacturing Conditions

| | | Cross Section Size before Forging | | Heating Condition 1 | | Cross Section Size after Forging | | Forging Ratio | | Heating Condition 2 | | |
|---|---|---|---|---|---|---|---|---|---|---|---|---|
| No. | Steel Sample ID | Top Side (mm) | Bottom Side (mm) | Heating Temp. (° C.) | Heating Time (hr.) | Top Side (mm) | Bottom Side (mm) | Top Side | Bottom Side | Heating Temp. (° C.) | Heating Time (hr.) | Remarks |
| 2-1 | A-1 | 1330 × 1230 | 1280 × 860 | 1150 | 10 | 550 × 550 | 550 × 550 | 5.4 | 3.6 | — | — | Reference Steel |
| 2-2 | B-1 | 1330 × 1230 | 1280 × 860 | 1250 | 24 | 1050 × 1050 | 1050 × 860 | 1.5 | 1.2 | 1250 | 24 | Comparative Example |
| 2-3 | B-1 | 1330 × 1230 | 1280 × 860 | 1250 | 24 | 790 × 790 | 790 × 790 | 2.6 | 1.8 | 1250 | 24 | Comparative Example |

TABLE 5-continued

Manufacturing Conditions

| No. | Steel Sample ID | Cross Section Size before Forging | | Heating Condition 1 | | Cross Section Size after Forging | | Forging Ratio | | Heating Condition 2 | | Remarks |
|---|---|---|---|---|---|---|---|---|---|---|---|---|
| | | Top Side (mm) | Bottom Side (mm) | Heating Temp. (° C.) | Heating Time (hr.) | Top Side (mm) | Bottom Side (mm) | Top Side | Bottom Side | Heating Temp. (° C.) | Heating Time (hr.) | |
| 2-4 | B-1 | 1330 × 1230 | 1280 × 860 | 1250 | 24 | 740 × 740 | 740 × 740 | 3.0 | 2.0 | 1250 | 24 | Inventive Example |
| 2-5 | B-1 | 1330 × 1230 | 1280 × 860 | 1250 | 24 | 640 × 640 | 640 × 640 | 4.0 | 2.7 | 1250 | 24 | Inventive Example |
| 2-6 | B-1 | 1330 × 1230 | 1280 × 860 | 1250 | 24 | 560 × 560 | 560 × 560 | 5.2 | 3.5 | 1250 | 24 | Inventive Example |
| 2-7 | B-1 | 1330 × 1230 | 1280 × 860 | 1250 | 24 | 500 × 500 | 500 × 500 | 6.5 | 4.4 | 1250 | 24 | Inventive Example |
| 2-8 | B-1 | 1330 × 1230 | 1280 × 860 | 1250 | 24 | 460 × 460 | 460 × 460 | 7.7 | 5.2 | 1250 | 24 | Inventive Example |
| 2-9 | B-1 | 1330 × 1230 | 1280 × 860 | 1250 | 24 | 740 × 740 | 740 × 740 | 3.0 | 2.0 | 1250 | 10 | Inventive Example |
| 2-10 | B-1 | 1330 × 1230 | 1280 × 860 | 1250 | 24 | 770 × 770 | 770 × 770 | 2.8 | 1.9 | 1250 | 20 | Comparative Example |

The evaluation results are shown in Table 6. Those ingot materials that were obtained under the condition Nos. 2-2 and 2-3 where the forging ratio is less than 2.0 have a larger degree of segregation, showing little improvement in the rolling contact fatigue life characteristics as compared to steel (Steel No. A-1) obtained under the reference condition No. 2-1. It can be appreciated that those ingot materials that were prepared under the condition Nos. 2-4 to 2-8 where the forging ratio is not less than 2.0 and the degree of segregation is not more than 2.8 show better rolling contact fatigue life characteristics than steel (Steel No. A-1) prepared under the to reference condition No. 2-1. These analyses revealed that the rolling contact fatigue life characteristics of steel could be improved by setting the forging ratio to be 2.0 or more and the degree of segregation to be 2.8 or less.

TABLE 6

Experimental Results

| No. | Steel Sample ID | $C_{Mo(max)}/C_{Mo(ave)}$ | Maximum Diameter of Inclusions (μm) | Rolling Contact Fatigue Life Ratio | Remarks |
|---|---|---|---|---|---|
| 2-1 | A-1 | 1.8 | 40.3 | 1.00 | Reference Steel |
| 2-2 | B-1 | 3.3 | 70.9 | 0.95 | Comparative Example |
| 2-3 | B-1 | 3.0 | 62.1 | 0.99 | Comparative Example |
| 2-4 | B-1 | 2.4 | 49.5 | 1.35 | Inventive Example |
| 2-5 | B-1 | 2.1 | 41.6 | 1.37 | Inventive Example |
| 2-6 | B-1 | 1.9 | 36.9 | 1.42 | Inventive Example |
| 2-7 | B-1 | 1.8 | 32.1 | 1.43 | Inventive Example |
| 2-8 | B-1 | 1.4 | 29.6 | 1.45 | Inventive Example |
| 2-9 | B-1 | 2.8 | 50.0 | 1.34 | Inventive Example |
| 2-10 | B-1 | 2.9 | 55.1 | 0.99 | Comparative Example |

Further, the inventors prepared bearing steel samples with the chemical compositions shown in Table 7, and investigated the degree of segregation, the maximum diameter of inclusions, and the rolling contact fatigue life characteristics of the bearing steel samples thus prepared. The degree of segregation, the maximum diameter of inclusions, and the rolling contact fatigue life characteristics were investigated by a testing method similar to that used in the examples described below. To investigate how the degree of segregation affects the rolling contact fatigue life characteristics, steel samples were prepared under the same conditions except for the Mo content in steel, i.e., the steel samples had different Mo contents so that they would show different degrees of segregation. Specifically, ingot samples, each having dimensions of a 1350 mm×1250 mm cross section (top side) and a 1280 mm×830 mm cross section (bottom side), were prepared by steelmaking in a converter and subsequent ingot casting; each of the ingot samples thus obtained were forged to a steel sample having a 800 mm square section; the steel sample was subjected to soaking at 1270° C. for 48 hours; and then the steel sample was forged to have a 650 mm square section. A test piece for observation of nonmetallic inclusions and a test piece for EPMA mapping analysis were collected from the forged steel sample as shown in FIG. 1; a test piece for rolling contact fatigue analysis was collected from the forged steel sample as shown in FIG. 5; and the test pieces were subjected to investigation of the degree of Mo segregation, the diameter of nonmetallic inclusions, and the rolling contact fatigue life characteristics of the test specimens, respectively, using the test method described below. In this case, each test piece was collected from a forged steel billet at a portion corresponding to the bottom side of the ingot material.

TABLE 7

Chemical Composition (mass %)

| Steel Sample ID | C | Si | Mn | P | S | Cr | Al | Mo | O | N | Remarks |
|---|---|---|---|---|---|---|---|---|---|---|---|
| A-1 | 1.05 | 0.25 | 0.45 | 0.016 | 0.008 | 1.45 | 0.025 | 0.18 | 0.0010 | 0.0031 | Reference Steel |
| C-1 | 0.63 | 0.26 | 0.88 | 0.008 | 0.006 | 0.77 | 0.025 | 0.25 | 0.0010 | 0.0031 | Conforming Steel |

TABLE 7-continued

Chemical Composition (mass %)

| Steel Sample ID | C | Si | Mn | P | S | Cr | Al | Mo | O | N | Remarks |
|---|---|---|---|---|---|---|---|---|---|---|---|
| C-2 | 0.60 | 0.32 | 0.91 | 0.010 | 0.005 | 0.89 | 0.025 | 0.32 | 0.0010 | 0.0033 | Conforming Steel |
| C-3 | 0.61 | 0.30 | 0.85 | 0.008 | 0.004 | 0.75 | 0.230 | 0.08 | 0.0008 | 0.0040 | Conforming Steel |
| C-4 | 0.63 | 0.25 | 0.87 | 0.009 | 0.004 | 0.77 | 0.031 | 0.15 | 0.0009 | 0.0038 | Conforming Steel |
| C-5 | 0.64 | 0.31 | 0.83 | 0.011 | 0.005 | 0.76 | 0.031 | 0.49 | 0.0007 | 0.0041 | Conforming Steel |
| C-6 | 0.61 | 0.21 | 0.81 | 0.008 | 0.004 | 0.76 | 0.026 | <u>0.61</u> | 0.0009 | 0.0034 | Comparative Steel |
| C-7 | 0.62 | 0.28 | 0.88 | 0.007 | 0.005 | 0.80 | 0.030 | 0.50 | 0.0008 | 0.0040 | Conforming Steel |
| C-8 | 0.61 | 0.24 | 0.85 | 0.008 | 0.004 | 0.88 | 0.028 | <u>0.52</u> | 0.0008 | 0.0042 | Comparative Steel |

The results obtained by the aforementioned investigation are shown in Table 8. Table 8 shows that improvements in the rolling contact fatigue life characteristics can be found where the degree of Mo segregation is 2.8 or less. In contrast, there is little improvement in the rolling contact fatigue life characteristics where the degree of segregation exceeds 2.8. These analyses revealed that the rolling contact fatigue life characteristics could be improved by setting the degree of segregation to be 2.8 or less. Note that the lower limit of the degree of segregation is preferably 1.0 since the degree of segregation is 1.0 when no Mo segregation exists in the steel.

Here, in addition to Mo, elements such as Cr, P, and S can also cause segregation which adversely affects the rolling contact fatigue life characteristics, and thus the degree of segregation of these elements also need to be 2.8 or less. Meanwhile, they have higher diffusion rates than that of Mo, and thus, the degree of segregation of these elements can be suppressed below 2.8 as long as the degree of segregation of Mo is set to be 2.8 or less. As such, the present invention solely focused on and specified the degree of segregation of Mo.

TABLE 8

Experimental Results

| No. | Steel Sample ID | $C_{Mo(max)}/C_{Mo(ave)}$ | Maximum Diameter of Inclusions (μm) | Rolling Contact Fatigue Life Ratio | Remarks |
|---|---|---|---|---|---|
| 1 | A-1 | 1.8 | 40.3 | 1.00 | Reference Steel |
| 2 | C-1 | 2.2 | 25.3 | 1.37 | Inventive Example |
| 3 | C-2 | 2.4 | 26.2 | 1.35 | Inventive Example |
| 4 | C-3 | 1.4 | 23.2 | 1.39 | Inventive Example |
| 5 | C-4 | 1.7 | 21.5 | 1.38 | Inventive Example |
| 6 | C-5 | 2.7 | 20.7 | 1.39 | Inventive Example |
| 7 | C-6 | 3.1 | 23.1 | 1.08 | Comparative Example |
| 8 | C-7 | 2.8 | 27.6 | 1.39 | Inventive Example |
| 9 | C-8 | 2.9 | 27.5 | 1.09 | Comparative Example |

The present invention may suppress the formation of eutectic carbides even in ingot materials manufactured by ingot casting, and is therefore particularly advantageous when applied to ingot materials manufactured by ingot casting. Additionally, the use of ingot materials as bearing steel material allows for manufacture of bearing steel products having a wide range of cross sectional dimensions.

In addition to the aforementioned basic components, the following components may optionally be added to the steel:
at least one element selected from:
Cu: 0.005 mass % to 0.5 mass %; and
Ni: 0.005 mass % to 1.00 mass %.

Cu and Ni are elements that improve the quench hardenability and increase the strength after tempering to improve the rolling contact fatigue life characteristics of steel. Cu and Ni may be selectively added to steel depending on the required strength thereof. To obtain this effect, Cu and Ni are preferably added by 0.005 mass % or more. However, addition of Cu by more than 0.5 mass % and of Ni by more than 1.00 mass % rather deteriorates the machinability by cutting of the resulting steel. Accordingly, Cu and Ni are each preferably added to steel in amounts not exceeding the upper limits of 0.5 mass % and 1.00 mass %, respectively.

Similarly, the following components in addition to the above may also be added to the bearing steel according to the present invention in order to increase the strength and to improve the rolling contact fatigue life characteristics of the steel:
at least one selected from:
W: 0.001 mass % to 0.5 mass %:
Nb: 0.001 mass % to 0.1 mass %;
Ti: 0.001 mass % to 0.1 mass %;
Zr: 0.001 mass % to 0.1 mass %; and
V: 0.002 mass % to 0.5 mass %.

W, Nb, Ti, Zr, and V are elements for improving the hardenability and increasing the strength after tempering of steel, and thus may be selectively added to steel depending on the required strength thereof. To obtain this effect, W, Nb, Ti, and Zr are each preferably added by at least 0.001 mass %, respectively, and V is preferably added by at least 0.002 mass %. However, addition of W and V by more than 0.5 mass %, respectively, and of Nb, Ti, and Zr by more than 0.1 mass %, respectively, rather deteriorates the machinability by cutting of the resulting steel. Accordingly, these elements are preferably added to steel in amounts not exceeding these upper limits, respectively.

B: 0.0002 Mass % to 0.005 Mass %

Boron (B) is an element that improves the quench hardenability of steel, thereby increasing the strength after tempering and improving the rolling contact fatigue life characteristics of the steel. Thus, B may optionally be added to steel. To obtain this effect, B is preferably added by 0.0002 mass % or more. However, addition of B by more than 0.005 mass % deteriorates the formability of the resulting steel. Accordingly, B is preferably added in amounts from 0.0002 mass % to 0.005 mass %.

The other components than those described above of the bearing steel according to the present invention are Fe and incidental impurities. Examples of the incidental impurities include Sb, Sn, As, Hf, and so on.

The conditions under which the bearing steel of the present invention can be manufactured will now be described below.

The ingot material having the aforementioned chemical composition is melted in a vacuum melting furnace or a converter, further subjected to a known refining process such as degassing, and subsequently to ingot casting to obtain a cast steel product. The cast steel product is further subjected to forming processes such as rolling and forging to obtain bearing parts.

Since Mo segregation will have occurred in the central portion in cross section of the resulting cast steel product, the cast steel product should be subjected to a treatment for reducing the aforementioned degree of Mo segregation to 2.8 or less. This treatment requires a heating process as described below.

Heating Temperature: 1150° C. Or Higher and Lower than 1350° C.

The degree of Mo segregation in the central segregation zone should be reduced for improving the rolling contact fatigue life characteristics of steel. In addition, in the case of a cast steel product being prepared by ingot casting, segregation in the casting direction (V-segregation) and segregation in the direction opposite to the casting direction (inverse V-segregation), which tend to occur in the vicinity of the central portion in cross section of the cast steel product, may be mitigated by heating the cast steel product under a predetermined condition. When the heating temperature is lower than 1150° C., the degree of segregation cannot be reduced sufficiently, in which case the above-mentioned effect cannot be obtained. When the heating temperature is 1350° C. or higher, melting occurs at those portions where the degree of segregation is relatively high and cracks form in the steel material. In view of the above, the heating temperature is to be 1150° C. or higher and lower than 1350° C., and preferably 1150° C. or higher and 1300° C. or lower.

Heating Retention Time: Longer than 10 Hours

As mentioned earlier, the degree of Mo segregation, V-segregation, and inverse V-segregation in steel should be reduced in order to improve the rolling contact fatigue life characteristics of the steel. Increasing the heating temperature is effective in terms of reducing the degree of segregation, but there is a limit to such an increase in temperature. Therefore, the cast steel product is retained at a heating temperature for a period longer than 10 hours so that the degree of segregation decreases. A heating retention time not longer than 10 hours cannot reduce the degree of segregation sufficiently, in which case the above-described effect cannot be obtained. Accordingly, the heating retention time is limited to longer than 10 hours in the present invention. The upper limit is practically, but not necessarily, 100 hours.

The heating treatment may be carried out as a series of heating processes as long as the total retention time at temperatures of 1150° C. or higher and lower than 1350° C. during these processes exceeds 10 hours. The above-described heating treatment may be carried out either as pre-forging heating, i.e., as a process of heating the cast steel product prior to hot forging for forming the cast steel product into a desired cross sectional configuration, or as a heating process of the cast steel product independent of the pre-forging heating. Moreover, the cast steel product may also be subjected to the heating treatment after hot forging under the aforementioned conditions.

Further, during the forging process, the cast steel product should be extended such that the forging ratio becomes 2.0 or more. As mentioned earlier, internal defects, such as porous shrinkage cavity originated from a collection of coarse porosities, tend to occur in the cast steel product produced by ingot casting, and thus, the hot forging is performed to reduce these defects. In addition, nonmetallic inclusions present in the steel are broken down and refined into smaller components. To obtain this effect, the forging ratio is preferably set to be 2.0 or more. If the forging ratio is less than 2.0, there will be coarse defects, such as porous shrinkage cavity, and coarse nonmetallic inclusions in the steel, leading to internal cracks in the resulting bearing steel and deteriorating the rolling contact fatigue life characteristics. In view of the above, the cast steel product should be subjected to solid forging such that the forging ratio becomes 2.0 or more. In addition, the forging ratio is preferably 2.5 or more. The forging ratio is practically, but not necessarily, less than 8.0.

As used herein, the forging ratio represents the forging ratio in the solid forging as specified in JIS G0701. That is, it is a ratio of a sectional area A before forging to a sectional area a after forging (A/a).

EXAMPLES

Steel samples having the chemical compositions shown in Table 9 were prepared by steelmaking in a converter, and subjected to subsequent ingot casting where the steel samples were forged and heated under the conditions shown in Table 10, whereby an ingot materials for bearings were obtained. Note that Heating 1 and Heating 2 in Table 10 are the heating processes performed for both the purposes of forging and reducing segregation. Heating 3 is a heating process performed for the purpose of reducing the degree of segregation after forging. The degree of Mo segregation, the diameter of nonmetal inclusion, and the rolling contact fatigue life characteristics of the forged products were investigated as described below.

TABLE 9

| | Chemical Compositions | | | | | | | | | | |
|---|---|---|---|---|---|---|---|---|---|---|---|
| ID | C | Si | Mn | P | S | Cr | Al | Mo | O | N | Cu |
| A-1 | 1.05 | 0.25 | 0.45 | 0.016 | 0.008 | 1.45 | 0.025 | 0.18 | 0.0010 | 0.0031 | — |
| D-1 | 0.63 | 0.32 | 0.99 | 0.011 | 0.005 | 0.88 | 0.021 | 0.33 | 0.0010 | 0.0033 | 0.01 |
| D-2 | 0.62 | 0.27 | 0.85 | 0.012 | 0.004 | 0.78 | 0.025 | 0.25 | 0.0008 | 0.0035 | — |
| D-3 | 0.65 | 0.45 | 1.44 | 0.015 | 0.007 | 0.53 | 0.490 | 0.21 | 0.0011 | 0.0041 | — |
| D-4 | 0.56 | 0.42 | 0.99 | 0.013 | 0.004 | 0.51 | 0.005 | 0.49 | 0.0009 | 0.0033 | 0.24 |
| D-5 | 0.67 | 0.16 | 0.62 | 0.010 | 0.005 | 0.94 | 0.032 | 0.15 | 0.0010 | 0.0045 | — |
| D-6 | 0.61 | 0.45 | 1.42 | 0.009 | 0.007 | 0.99 | 0.021 | 0.22 | 0.0010 | 0.0042 | — |
| D-7 | 0.62 | 0.21 | 0.99 | 0.013 | 0.004 | 0.94 | 0.031 | 0.11 | 0.0013 | 0.0042 | 0.21 |
| D-8 | 0.47 | 0.45 | 1.48 | 0.015 | 0.004 | 0.51 | 0.055 | 0.12 | 0.0011 | 0.0049 | — |
| D-9 | 0.92 | 0.22 | 0.77 | 0.012 | 0.005 | 0.52 | 0.033 | 0.12 | 0.0009 | 0.0044 | — |
| D-10 | 0.62 | 0.70 | 0.92 | 0.011 | 0.004 | 0.72 | 0.032 | 0.12 | 0.0012 | 0.0062 | 0.18 |
| D-11 | 0.64 | 0.24 | 1.21 | 0.015 | 0.006 | 0.81 | 0.050 | 0.59 | 0.0006 | 0.0081 | — |
| D-12 | 0.70 | 0.32 | 0.97 | 0.007 | 0.008 | 0.51 | 0.005 | 0.23 | 0.0005 | 0.0055 | — |
| D-13 | 0.63 | 0.22 | 0.61 | 0.012 | 0.009 | 0.92 | 0.035 | 0.22 | 0.0007 | 0.0041 | — |

TABLE 9-continued

Chemical Compositions

| ID | | | | | | | | | | | |
|---|---|---|---|---|---|---|---|---|---|---|---|
| D-14 | 0.62 | 0.49 | 1.15 | 0.008 | 0.007 | 0.55 | 0.005 | 0.26 | 0.0008 | 0.0062 | — |
| D-15 | 0.56 | 0.16 | 1.07 | 0.014 | 0.006 | 1.10 | 0.080 | 0.25 | 0.0010 | 0.0059 | — |
| D-16 | 0.56 | 0.17 | 0.73 | 0.013 | 0.005 | 0.73 | 0.010 | 0.18 | 0.0008 | 0.0030 | 0.01 |
| D-17 | 0.64 | 0.26 | 0.88 | 0.010 | 0.006 | 0.82 | 0.530 | 0.17 | 0.0007 | 0.0045 | 0.01 |
| D-18 | 0.67 | 0.38 | 0.92 | 0.009 | 0.002 | 1.20 | 0.025 | 0.26 | 0.0009 | 0.0035 | — |
| D-19 | 0.66 | 0.35 | 0.90 | 0.008 | 0.001 | 0.40 | 0.033 | 0.27 | 0.0009 | 0.0036 | — |
| D-20 | 0.80 | 0.26 | 0.91 | 0.008 | 0.002 | 0.95 | 0.027 | 0.25 | 0.0008 | 0.0041 | — |
| D-21 | 0.60 | 0.25 | 0.79 | 0.008 | 0.001 | 0.85 | 0.027 | 0.26 | 0.0009 | 0.0020 | — |
| D-22 | 0.62 | 0.26 | 0.81 | 0.009 | 0.002 | 0.88 | 0.029 | 0.25 | 0.0010 | 0.0160 | — |
| D-23 | 0.63 | 0.23 | 0.88 | 0.007 | 0.002 | 0.78 | 0.028 | 0.25 | 0.0009 | 0.0034 | — |
| D-24 | 0.62 | 0.22 | 0.90 | 0.006 | 0.001 | 0.77 | 0.030 | 0.26 | 0.0008 | 0.0035 | — |
| D-25 | 0.63 | 0.23 | 0.88 | 0.007 | 0.001 | 0.79 | 0.026 | 0.25 | 0.0009 | 0.0034 | — |
| D-26 | 0.64 | 0.24 | 0.87 | 0.007 | 0.001 | 0.76 | 0.026 | 0.26 | 0.0010 | 0.0034 | — |
| D-27 | 0.62 | 0.23 | 0.87 | 0.008 | 0.001 | 0.77 | 0.028 | 0.25 | 0.0009 | 0.0033 | — |
| D-28 | 0.64 | 0.23 | 0.88 | 0.009 | 0.002 | 0.76 | 0.027 | 0.25 | 0.0009 | 0.0037 | — |
| D-29 | 0.62 | 0.22 | 0.86 | 0.007 | 0.003 | 0.77 | 0.028 | 0.25 | 0.0008 | 0.0034 | — |
| D-30 | 0.63 | 0.23 | 0.88 | 0.008 | 0.002 | 0.77 | 0.028 | 0.25 | 0.0009 | 0.0034 | — |
| D-31 | 0.62 | 0.25 | 0.86 | 0.007 | 0.001 | 0.77 | 0.028 | 0.26 | 0.0012 | 0.0041 | — |

| ID | Ni | W | Nb | Ti | Zr | V | B | Remarks |
|---|---|---|---|---|---|---|---|---|
| A-1 | — | — | — | — | — | — | — | Reference |
| D-1 | 0.01 | — | — | — | — | — | — | Conforming Steel |
| D-2 | — | — | — | — | — | — | — | Conforming Steel |
| D-3 | — | — | — | — | — | 0.05 | — | Conforming Steel |
| D-4 | 0.75 | — | 0.012 | — | — | — | — | Conforming Steel |
| D-5 | — | — | — | — | — | — | 0.0012 | Conforming Steel |
| D-6 | — | — | — | — | — | — | — | Conforming Steel |
| D-7 | 0.11 | — | — | — | 0.003 | — | — | Conforming Steel |
| D-8 | — | — | — | — | — | — | — | Comparative Steel |
| D-9 | — | — | — | — | — | — | — | Comparative Steel |
| D-10 | 0.09 | — | — | — | — | — | — | Comparative Steel |
| D-11 | — | — | — | — | — | — | — | Comparative Steel |
| D-12 | — | — | 0.045 | — | — | — | — | Conforming Steel |
| D-13 | — | 0.35 | — | — | — | — | — | Conforming Steel |
| D-14 | — | — | — | 0.011 | — | — | — | Conforming Steel |
| D-15 | — | — | — | 0.011 | — | — | — | Conforming Steel |
| D-16 | 0.02 | — | — | — | — | — | — | Conforming Steel |
| D-17 | 0.02 | — | — | — | — | — | — | Comparative Steel |
| D-18 | — | — | — | — | — | — | — | Comparative Steel |
| D-19 | — | — | — | — | — | — | — | Comparative Steel |
| D-20 | — | — | — | — | — | — | — | Comparative Steel |
| D-21 | — | — | — | — | — | — | — | Comparative Steel |
| D-22 | — | — | — | — | — | — | — | Comparative Steel |
| D-23 | — | — | — | — | — | — | — | Conforming Steel |
| D-24 | — | — | — | — | — | — | — | Conforming Steel |
| D-25 | — | — | — | — | — | — | — | Conforming Steel |
| D-26 | — | — | — | — | — | — | — | Conforming Steel |
| D-27 | — | — | — | — | — | — | — | Conforming Steel |
| D-28 | — | — | — | — | — | — | — | Conforming Steel |
| D-29 | — | — | — | — | — | — | — | Conforming Steel |
| D-30 | — | — | — | — | — | — | — | Conforming Steel |
| D-31 | — | — | — | — | — | — | — | Conforming Steel |

TABLE 10

Manufacturing Conditions

| | Cross Section Size of ingot (mm) | | Heating 1 | | Cross Section Size 1 after Forging (mm) | | Heating 2 | | Cross Section Size 2 after Forging (mm) | |
|---|---|---|---|---|---|---|---|---|---|---|
| ID | Top Side | Bottom Side | Heating Temp. (° C.) | Retention Time (hr.) | Shape* | Cross Section Size | Heating Temp. (° C.) | Retention Time (hr.) | Shape* | Cross Section Size |
| A-1 | 1340 × 1230 | 1280 × 860 | 1150 | 10 | b | 550 | — | — | — | — |
| D-1 | 1340 × 1230 | 1280 × 860 | 1200 | 15 | b | 800 | 1270 | 24 | b | 650 |
| D-2 | 1340 × 1230 | 1280 × 860 | 1270 | 15 | b | 800 | 1270 | 20 | b | 650 |
| D-3 | 1340 × 1230 | 1280 × 860 | 1200 | 6 | b | 750 | 1270 | 10 | b | 500 |
| D-4 | 1340 × 1230 | 1280 × 860 | 1270 | 15 | b | 650 | 1270 | 15 | b | 460 |
| D-5 | 1340 × 1230 | 1280 × 860 | 1350 | 10 | b | 750 | 1150 | 2 | b | 650 |
| D-6 | 1340 × 1230 | 1280 × 860 | 1150 | 15 | b | 700 | 1150 | 12 | b | 550 |
| D-7 | 1340 × 1230 | 1280 × 860 | 1200 | 15 | b | 800 | 1150 | 5 | a | 700 |
| D-8 | 1340 × 1230 | 1280 × 1000 | 1270 | 15 | b | 900 | 1200 | 3 | b | 700 |

TABLE 10-continued

| | | | | | Manufacturing Conditions | | | | | |
|---|---|---|---|---|---|---|---|---|---|---|
| D-9 | 1340 × 1230 | 1280 × 860 | 1200 | 15 | b | 1000 | 1270 | 3 | b | 650 |
| D-10 | 1340 × 1230 | 1280 × 860 | 1200 | 15 | b | 750 | 1270 | 3 | b | 700 |
| D-11 | 1340 × 1230 | 1280 × 860 | 1250 | 15 | b | 650 | 1100 | 25 | b | 700 |
| D-12 | 1340 × 1230 | 1100 × 1100 | 1270 | 15 | b | 1000 | 1270 | 72 | b | 750 |
| D-13 | 1340 × 1230 | 1280 × 860 | 1250 | 15 | b | 800 | 1270 | 20 | b | 460 |
| D-14 | 1340 × 1230 | 1280 × 860 | 1300 | 15 | b | 500 | — | — | — | — |
| D-15 | 1340 × 1230 | 1000 × 1000 | 1250 | 15 | b | 900 | 1270 | 30 | a | 550 |
| D-16 | 1340 × 1230 | 1280 × 860 | 1250 | 15 | b | 800 | 1270 | 20 | a | 650 |
| D-17 | 1340 × 1230 | 1280 × 860 | 1300 | 15 | b | 650 | 1300 | 35 | b | 650 |
| D-18 | 1340 × 1230 | 1280 × 860 | 1270 | 15 | b | 750 | 1270 | 12 | b | 550 |
| D-19 | 1340 × 1230 | 1280 × 860 | 1270 | 15 | b | 700 | 1270 | 7 | b | 500 |
| D-20 | 1340 × 1230 | 1280 × 860 | 1270 | 15 | b | 750 | 1270 | 9 | b | 750 |
| D-21 | 1340 × 1230 | 1280 × 860 | 1270 | 15 | b | 800 | 1270 | 6 | b | 700 |
| D-22 | 1340 × 1230 | 1280 × 1000 | 1270 | 15 | b | 850 | 1270 | 11 | b | 650 |
| D-23 | 1340 × 1230 | 1280 × 860 | 1270 | 15 | b | 650 | 1270 | 4 | b | 650 |
| D-24 | 1340 × 1230 | 1280 × 860 | 1270 | 5 | b | 800 | — | — | — | — |
| D-25 | 1340 × 1230 | 1280 × 860 | 1050 | 10 | b | 800 | 1270 | 8 | b | 550 |
| D-26 | 1340 × 1230 | 1280 × 860 | 1270 | 10 | b | 800 | 1270 | 15 | b | 500 |
| D-27 | 1340 × 1230 | 1280 × 860 | 1200 | 10 | b | 800 | 1270 | 15 | b | 550 |
| D-28 | 1340 × 1230 | 1280 × 860 | 1270 | 10 | b | 800 | 1270 | 10 | b | 700 |
| D-29 | 1340 × 1230 | 1280 × 860 | 1270 | 10 | b | 860 | 1270 | 10 | a | 700 |
| D-30 | 1340 × 1230 | 1280 × 860 | 1270 | 10 | b | 800 | 1270 | 10 | a | 650 |
| D-31 | 1340 × 1230 | 1280 × 860 | 1270 | 10 | b | 800 | 1270 | 24 | b | 650 |

| | Heating 3 | | Total Heating Retention Time at ≥1150° C. and ≤1350° C. (hr.) | Forging Ratio (Initial to Final Cross Section) | | |
|---|---|---|---|---|---|---|
| ID | Heating Temp. (° C.) | Retention Time (hr.) | | Top Side | Bottom Side | Remarks |
| A-1 | — | — | 10 | 5.4 | 3.6 | Reference Example |
| D-1 | — | — | 39 | 3.9 | 2.6 | Inventive Example |
| D-2 | — | — | 35 | 3.9 | 2.6 | Inventive Example |
| D-3 | — | — | 16 | 6.6 | 4.4 | Inventive Example |
| D-4 | 1270 | 15 | 45 | 7.8 | 5.2 | Inventive Example |
| D-5 | — | — | 12 | 3.9 | 2.6 | Inventive Example |
| D-6 | — | — | 27 | 5.4 | 3.6 | Inventive Example |
| D-7 | — | — | 20 | 4.3 | 2.9 | Inventive Example |
| D-8 | — | — | 18 | 3.4 | 2.6 | Comparative Steel |
| D-9 | — | — | 18 | 3.9 | 2.6 | Comparative Steel |
| D-10 | — | — | 18 | 3.4 | 2.2 | Comparative Steel |
| D-11 | — | — | 40 | 3.4 | 2.2 | Comparative Steel |
| D-12 | — | — | 87 | 2.9 | 2.2 | Inventive Example |
| D-13 | 1250 | 48 | 83 | 7.8 | 5.2 | Inventive Example |
| D-14 | — | — | 15 | 6.6 | 4.4 | Inventive Example |
| D-15 | — | — | 45 | 6.9 | 4.2 | Inventive Example |
| D-16 | — | — | 35 | 5.0 | 3.3 | Inventive Example |
| D-17 | 1300 | 35 | 85 | 3.9 | 2.6 | Comparative Steel |
| D-18 | — | — | 27 | 5.4 | 3.6 | Comparative Steel |
| D-19 | 1270 | 15 | 37 | 6.6 | 4.4 | Comparative Steel |
| D-20 | — | — | 24 | 2.9 | 2.0 | Comparative Steel |
| D-21 | 1270 | 25 | 46 | 3.4 | 2.2 | Comparative Steel |
| D-22 | — | — | 26 | 3.9 | 3.0 | Comparative Steel |
| D-23 | — | — | 9 | 3.9 | 2.6 | Comparative Steel |
| D-24 | — | — | 15 | 2.6 | 1.7 | Comparative Steel |
| D-25 | — | — | 8 | 5.4 | 3.6 | Comparative Steel |
| D-26 | — | — | 15 | 6.6 | 4.4 | Inventive Example |
| D-27 | — | — | 15 | 5.4 | 3.6 | Inventive Example |
| D-28 | — | — | 20 | 3.4 | 2.2 | Inventive Example |
| D-29 | — | — | 20 | 4.3 | 2.9 | Inventive Example |
| D-30 | — | — | 20 | 5.0 | 3.3 | Inventive Example |
| D-31 | — | — | 34 | 3.9 | 2.6 | Inventive Example |

*a: circular forging, b: square forging

[Maximum Diameter of Inclusions].

Figure 2:
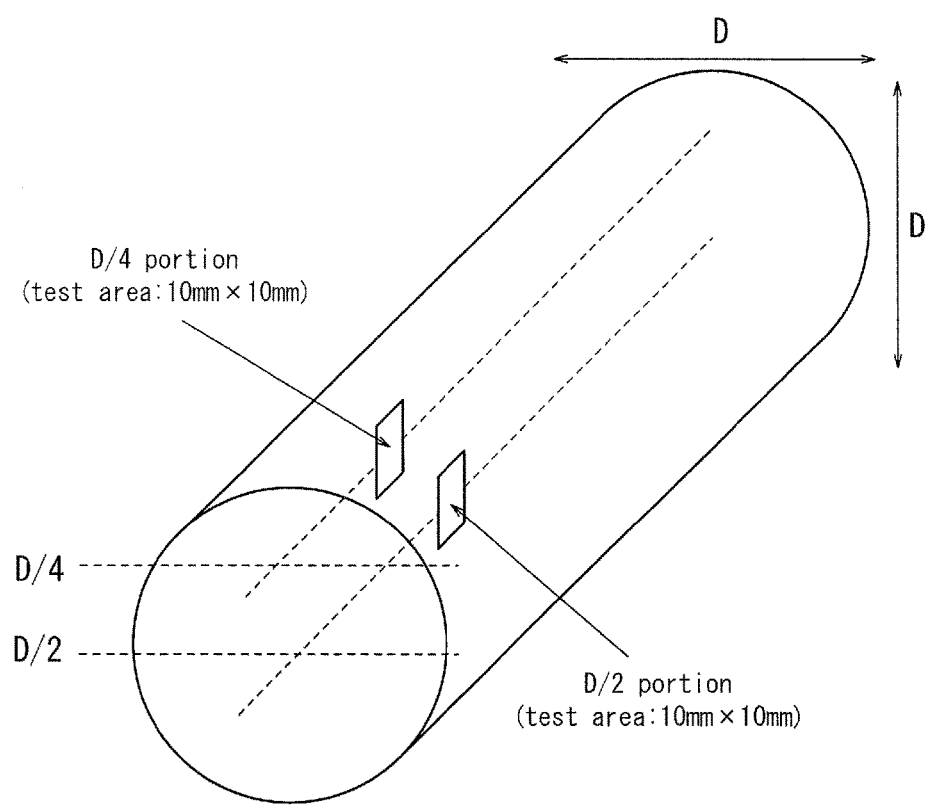
FIG. 2 is a diagram illustrating positions in a circular-forged steel billet where samples for microstructure observation are collected from, and the test surface sizes.

Regarding the maximum diameter of inclusions, samples for microstructure observation were collected from the forged steel billets at those positions corresponding to a ($T_1/2$, $T_2/2$) portion (central portion) and a ($T_1/2$, $T_2/4$) portion, where $T_1=T_2$ represents the length of each side of each square-forged steel billet (see FIG. 1), or to a D/4 portion and a D/2 portion, where D represents the diameter of each circular-forged billet (see FIG. 2), respectively, in such a way that the cross sections to be observed of the samples correspond to the cross sections in the extension direction of the billets. Then, a total of 30 samples were observed under a microscope at magnification ×200 in 100 mm$^2$ (the test surface size: 10 mm×10 mm; see FIG. 3) to measure the lengths of the short axis and the long axis of a nonmetallic inclusion in each sample. The measured lengths were converted to an inclusion diameter by {(length of short axis)×(length of long axis)}$^{1/2}$. Based on these measurements, the maximum diameter of inclusions present in 30000 mm² of the ingot was predicted by extreme statistics and the predicted value was taken as the maximum diameter of inclusions. In this case, the prediction of the maximum diameter of inclusions by extreme statistics was conduced using the extreme statistics method as described in "The Phase II Report of the Study Group for Evaluation of Non-metallic Inclusions in Bearing Steel" by the 2nd Study Group of the Japanese Society of Tribologists. Each test specimen was collected from a forged steel billet at a portion corresponding to the bottom side of an ingot material.

[Degree of Segregation]

Figure 3:
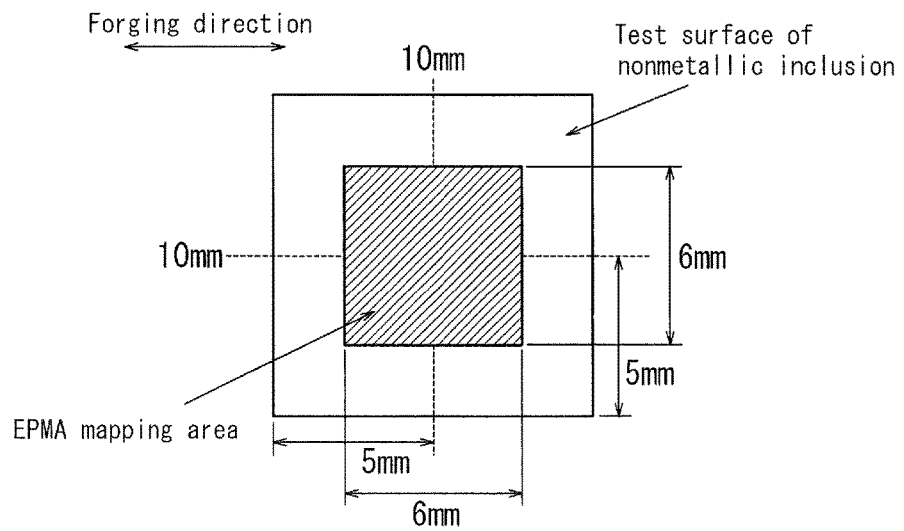
FIG. 3 is a diagram illustrating the test surface area for EPMA (electron probe microanalyzer) mapping analysis.
Figure 4:
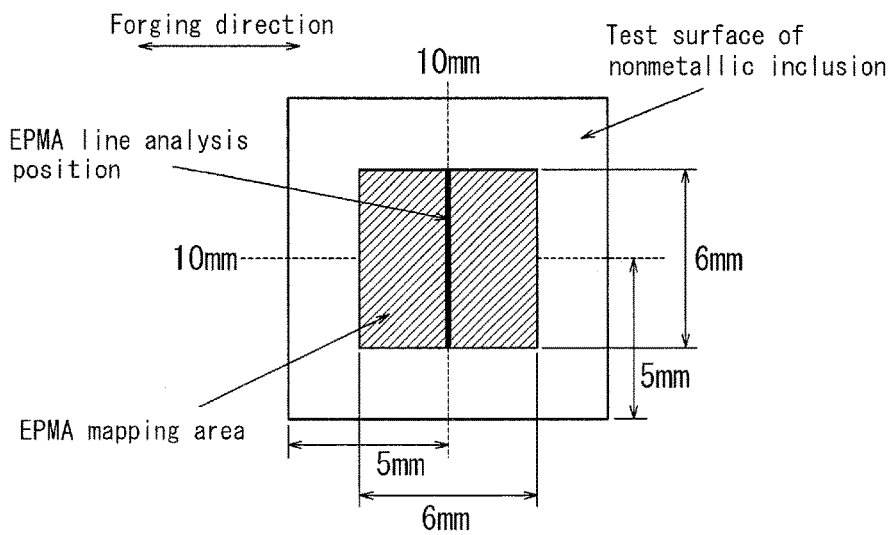
FIG. 4 is a diagram illustrating a position subjected to EPMA line analysis.

The degree of segregation was determined by electron probe microanalyzer (EPMA) while using the aforementioned samples evaluated for nonmetallic inclusions. The degree of segregation was investigated by: carrying out area analysis of the center portion (6 mm×6 mm) of each of the samples as shown in FIG. 3 under the measuring conditions of EPMA, including beam diameter of 30 μmϕ, acceleration voltage of 20 kV, and electric current of $4 \times 10^{-7}$ A; carrying out line analysis, as shown in FIG. 4, along a line including a portion having a high Mo intensity in the region where the area analysis was carried out; determining a maximum of Mo intensity values, $C_{Mo(max)}$, and an average of Mo intensity values, $C_{Mo(ave)}$, respectively; and calculating a ratio of the maximum Mo intensity to the average Mo intensity, $C_{Mo(max)}/C_{Mo(ave)}$, which ratio was defined as the degree of segregation.

[Rolling Contact Fatigue Life Characteristics]

Figure 6:
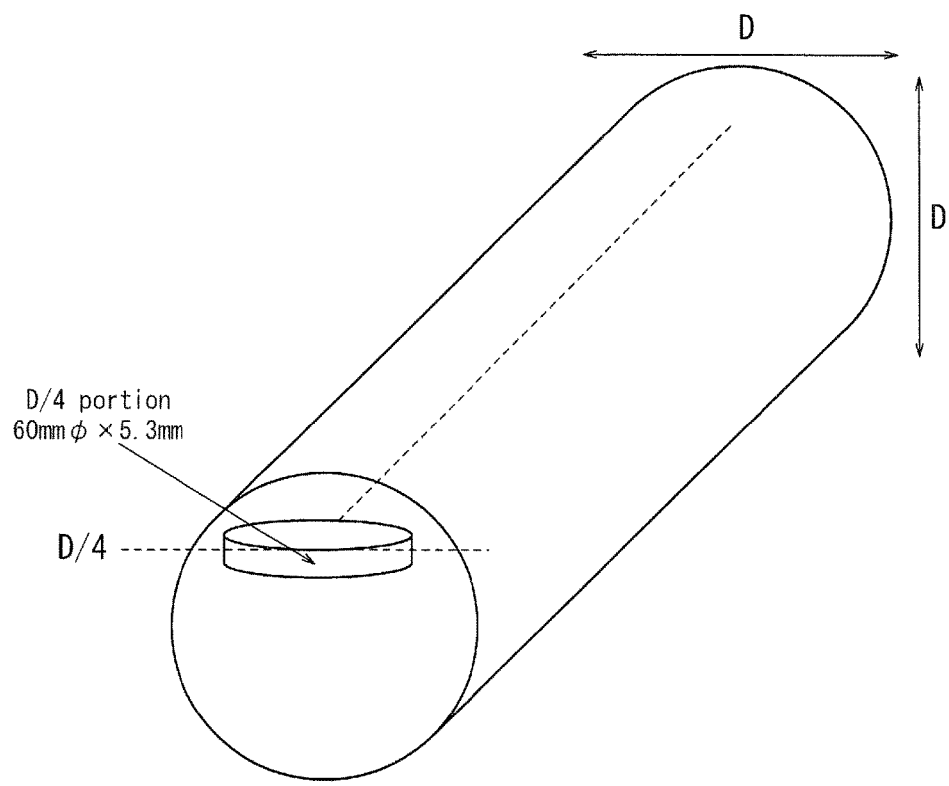
FIG. 6 is a diagram illustrating a position in a circular-forged steel billet where a sample for rolling contact fatigue life evaluation is collected from, and the test surface size.

The rolling contact fatigue life characteristics of samples are preferably evaluated by actually forging, cutting, quenching, and tempering the samples and using the resulting products for a while. However, such evaluation takes a long time. Accordingly, evaluation of the rolling contact fatigue life characteristics was performed using a radial-type rolling contact fatigue life tester. Specifically, the evaluation was performed by: cutting a disc-shaped test piece of 60 mmϕ×5.3 mm out of a position corresponding to a ($T_1/2$, $T_2/4$) portion of a forged steel billet, where $T_1 = T_2$ represents the length of each side of each square-forged steel billet (see FIG. 5), or to a D/4 portion of a forged steel billet, where D represents the diameter of each circular-forged billet (see FIG. 6), respectively; heating the disc-shaped test piece to 950° C. and retaining it at the temperature for 20 minutes; quenching the test piece in oil of 25° C.; subjecting the test piece to tempering for heating the test specimen to 170° C. and retaining it at the temperature for 1.5 hours; subjecting the disc-shaped test piece thus treated and sized 60 mmϕ×5 mm to flat polishing to finish the test surface thereof into a mirror surface; then subjecting the test piece thus obtained to a rolling contact fatigue test using a thrust-type rolling contact fatigue tester such that steel balls are allowed to roll on the periphery having a diameter of approximately 38 mm of the test piece and the maximum Hertzian contact stress of 5.8 GPa is exerted thereon. Each test piece was collected from a forged steel billet at a portion corresponding to the bottom side of the ingot material.

The rolling contact fatigue life characteristics were evaluated by: counting the number of stress loading on each of 10 to 15 test pieces before exfoliation occurs in the test piece; analyzing the relationship between the number of stress loading and cumulative fracture probability using Weibull probability paper; determining the cumulative fracture probability of 10% (hereinafter, referred to as "$B_{10}$ life"); and judging that a test piece has improved in rolling contact fatigue life characteristics when the "$B_{10}$ life" of the test piece has increased by 10% or more as compared with that of the reference steel sample (A-1: steel corresponding to SUJ2).

Table 11 shows the test results on the degree of segregation, the nonmetallic inclusion diameter, and the rolling contact fatigue life characteristics. It can be appreciated that steel samples D-1 to D-7, D-12 to D-16, and D-26 to D-31, where the conditions of the chemical composition and the degree of segregation $C_{Mo(max)}/C_{Mo(ave)}$ according to the present invention are met, each have a degree of segregation and a nonmetallic inclusion diameter that are controlled within the scope of the present invention, providing good rolling contact fatigue life characteristics. In contrast, it can be appreciated that steel samples D-23 to D-25, each having a chemical composition within the scope of the present invention but the manufacturing conditions departing from the scope of the present invention, have a larger degree of segregation and a larger nonmetallic diameter, showing little improvement in rolling contact fatigue life characteristics. It can also be appreciated that steel samples D-8 to D-11 and D-17 to D-22 having chemical compositions departing from the scope of the present invention show little improvement in the rolling contact fatigue life characteristics, although manufactured under the conditions within the scope of the present invention.

TABLE 11

Experimental Results

| ID | $C_{Mo(max)}/C_{Mo(ave)}$ | Maximum Diameter of Inclusions (μm) | Rolling Contact Fatigue Life Ratio | Remarks |
|---|---|---|---|---|
| A-1 | 1.8 | 40.3 | 1.00 | Reference Example |
| D-1 | 2.6 | 42.3 | 1.35 | Inventive Example |
| D-2 | 2.3 | 27.5 | 1.37 | Inventive Example |
| D-3 | 2.4 | 37.3 | 1.36 | Inventive Example |
| D-4 | 2.4 | 24.3 | 1.44 | Inventive Example |
| D-5 | 2.6 | 41.1 | 1.34 | Inventive Example |
| D-6 | 2.5 | 39.3 | 135 | Inventive Example |
| D-7 | 2.3 | 48.3 | 1.31 | Inventive Example |
| D-8 | 2.3 | 42.5 | 1.07 | Comparative Steel |
| D-9 | 2.4 | 39.9 | 1.08 | Comparative Steel |
| D-10 | 2.2 | 61.5 | 1.05 | Comparative Steel |
| D-11 | 2.9 | 32.1 | 1.06 | Comparative Steel |
| D-12 | 1.9 | 20.9 | 1.45 | Inventive Example |
| D-13 | 1.6 | 21.3 | 1.44 | Inventive Example |
| D-14 | 2.3 | 22.5 | 1.39 | Inventive Example |
| D-15 | 2.1 | 23.3 | 1.39 | Inventive Example |
| D-16 | 2.2 | 39.4 | 1.36 | Inventive Example |
| D-17 | 2.1 | 62.3 | 1.04 | Comparative Steel |
| D-18 | 2.3 | 39.2 | 1.09 | Comparative Steel |
| D-19 | 2.2 | 37.7 | 1.09 | Comparative Steel |
| D-20 | 2.4 | 38.3 | 1.09 | Comparative Steel |
| D-21 | 2.3 | 37.7 | 1.08 | Comparative Steel |
| D-22 | 2.4 | 35.2 | 1.09 | Comparative Steel |
| D-23 | 2.9 | 37.7 | 1.07 | Comparative Steel |
| D-24 | 2.7 | 61.3 | 1.05 | Comparative Steel |
| D-25 | 3.0 | 37.2 | 1.06 | Comparative Steel |
| D-26 | 2.5 | 34.3 | 1.36 | Inventive Example |
| D-27 | 2.5 | 33.3 | 1.35 | Inventive Example |
| D-28 | 2.6 | 41.3 | 1.31 | Inventive Example |
| D-29 | 2.4 | 35.2 | 1.35 | Inventive Example |
| D-30 | 2.2 | 34.2 | 1.35 | Inventive Example |
| D-31 | 2.0 | 49.5 | 1.31 | Inventive Example |

INDUSTRIAL APPLICABILITY

With the ingot material according to the present invention, it is possible to manufacture bearing steel having excellent rolling contact fatigue life characteristics in an inexpensive manner by means of ingot casting, thereby successfully providing very valuable bearing steel in industrial terms.

The invention claimed is:

1. An ingot material for bearings comprising a chemical composition containing:
C: 0.56 mass % or more and 0.70 mass % or less;
Si: 0.15 mass % or more and less than 0.50 mass %;
Mn: 0.60 mass % or more and 1.50 mass % or less;
Cr: 0.50 mass % or more and 1.10 mass % or less;
Mo: 0.05 mass % or more and 0.5 mass % or less;
P: 0.025 mass % or less;
S: 0.025 mass % or less;
Al: 0.005 mass % or more and 0.500 mass % or less;
O: 0.0015 mass % or less;
N: 0.0030 mass % or more and 0.015 mass % or less; and
the balance including Fe and incidental impurities, wherein a degree of segregation defined by the following formula (1) is 2.8 or less, and a predicted value of the maximum diameter of inclusions present in 30000 mm² of the ingot, as calculated by extreme value statistics, is 60 μm or less:

$$C_{Mo(max)}/C_{Mo(ave)} \leq 2.8 \quad (1)$$

where $C_{Mo(max)}$ represents a maximum value of Mo intensity and $C_{Mo(ave)}$ represents an average value of Mo intensity.

2. The ingot material for bearings according to claim 1, wherein the chemical composition further contains at least one element selected from:
Cu: 0.005 mass % or more and 0.5 mass % or less; and
Ni: 0.005 mass % or more and 1.00 mass % or less.

3. The ingot material for bearings according to claim 1, wherein the chemical composition further contains at least one element selected from:
W: 0.001 mass % or more and 0.5 mass % or less;
Nb: 0.001 mass % or more and 0.1 mass % or less;
Ti: 0.001 mass % or more and 0.1 mass % or less;
Zr: 0.001 mass % or more and 0.1 mass % or less; and
V: 0.002 mass % or more and 0.5 mass % or less.

4. The ingot material for bearings according to claim 2, wherein the chemical composition further contains at least one element selected from:
W: 0.001 mass % or more and 0.5 mass % or less;
Nb: 0.001 mass % or more and 0.1 mass % or less;
Ti: 0.001 mass % or more and 0.1 mass % or less;
Zr: 0.001 mass % or more and 0.1 mass % or less; and
V: 0.002 mass % or more and 0.5 mass % or less.

5. The ingot material for bearings according to claim 1, wherein the chemical composition further contains
B: 0.0002 mass % or more and 0.005 mass % or less.

6. The ingot material for bearings according to claim 2, wherein the chemical composition further contains
B: 0.0002 mass % or more and 0.005 mass % or less.

7. The ingot material for bearings according to claim 3, wherein the chemical composition further contains
B: 0.0002 mass % or more and 0.005 mass % or less.

8. The ingot material for bearings according to claim 4, wherein the chemical composition further contains
B: 0.0002 mass % or more and 0.005 mass % or less.

9. A method of manufacturing an ingot material for bearings, comprising: subjecting steel having the chemical composition according to claim 1 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

10. A method of manufacturing an ingot material for bearings, comprising: subjecting steel having the chemical composition according to claim 2 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

11. A method of manufacturing an ingot material for bearings, comprising: subjecting steel having the chemical composition according to claim 3 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

12. A method of manufacturing an ingot material for bearings, comprising: subjecting steel having the chemical composition according to claim 4 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

13. A method of manufacturing an ingot material for bearings, comprising: subjecting steel having the chemical composition according to claim 5 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

14. A method of manufacturing an ingot material for bearings, comprising: subjecting steel having the chemical composition according to claim 6 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

15. A method of manufacturing an ingot material for bearings, comprising: subjecting steel having the chemical composition according to claim 7 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

16. A method of manufacturing an ingot material for bearings, comprising: subjecting steel having the chemical composition according to claim 8 to ingot casting to obtain a cast steel product; then subjecting the cast steel product to forging with a forging ratio of 2.0 or more; and subjecting the cast steel product to heat treatment for more than 10 hours in a temperature range of 1150° C. or higher and lower than 1350° C.

* * * * *